United States Patent [19]

Weber et al.

[11] Patent Number: 5,502,122

[45] Date of Patent: Mar. 26, 1996

[54] BLENDS BASED ON POLYARYLENE ETHERS AND POLYARYLENE SULFIDES

[75] Inventors: Martin Weber, Neustadt; Wolfgang Eberle, Mainz, both of Germany

[73] Assignee: BASF Aktiengesellschaft, Ludwigshafen, Germany

[21] Appl. No.: 410,301

[22] Filed: Mar. 24, 1995

[30] Foreign Application Priority Data

Mar. 26, 1994 [DE] Germany .................. 44 10 661.0
Jun. 14, 1994 [DE] Germany .................. 44 20 643.7

[51] Int. Cl.⁶ .................. C08L 81/04; C08L 81/06
[52] U.S. Cl. .................. 525/534; 525/535; 525/537; 525/906
[58] Field of Search .................. 525/534, 535, 525/537, 906

[56] References Cited

U.S. PATENT DOCUMENTS

| | | | |
|---|---|---|---|
| 4,904,744 | 2/1990 | Gergen et al. | 525/534 |
| 5,086,130 | 2/1992 | Dickinson et al. | 525/537 |
| 5,164,466 | 11/1992 | El-Hibri et al. | 525/537 |
| 5,276,111 | 1/1994 | Bagrodia et al. | 525/537 |

FOREIGN PATENT DOCUMENTS

| | | | |
|---|---|---|---|
| 6073290 | 3/1994 | Japan | 525/535 |
| 2113235 | 8/1983 | United Kingdom . | |

OTHER PUBLICATIONS

Derwent Abst. 299-872/89.

*Primary Examiner*—Thomas Hamilton, III
*Attorney, Agent, or Firm*—Keil & Weinkauf

[57] ABSTRACT

Molding materials comprise polyarylene ethers having terminal hydroxyl groups, polyarylene ethers having terminal groups which are not hydroxyl groups, polyarylene sulfides and furthermore fibrous or particulate fillers, rubber impact modifiers and additives or processing assistants.

6 Claims, No Drawings

BLENDS BASED ON POLYARYLENE ETHERS AND POLYARYLENE SULFIDES

The present invention relates to molding materials comprising

A) from 1 to 20% by weight of polyarylene ethers in which at least 0.03% by weight, based on the number average molecular weight $M_n$ of the polyarylene ethers, comprises terminal hydroxyl groups and which contain repeating units of the formula I

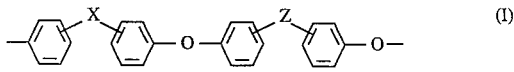
(I)

or corresponding units substituted in the nucleus by $C_1$–$C_6$-alkyl, $C_1$–$C_6$-alkoxy, aryl, chlorine or fluorine, where
X may be —$SO_2$—, —SO—, —O—, CO, —N=N—, —RC=$CR^a$—, —$CR^bR^c$— or a chemical bond and
Z is selected from the group consisting of —$SO_2$—, —SO—, CO, —N=N— and —RC=$CR^a$—,
R and $R^a$ are each hydrogen or $C_1$–$C_6$-alkyl and
$R^b$ and $R^c$ may each be hydrogen or $C_1$–$C_6$-alkyl, $C_4$–$C_{10}$-cycloalkyl, $C_4$–$C_{10}$-cycloalkyl, $C_1$–$C_6$-alkoxy or aryl or a fluorine or chlorine derivate of each of these, B) from 5 to 95% by weight of polyarylene ethers in which less than 0.03% by weight, based on the number average molecular weight $M_n$ of the polyarylene ethers, comprises hydroxyl groups, C) from 4 to 94% by weight of polyarylene sulfides, D) from 0 to 60% by weight of fibrous or particulate fillers, E) from 0 to 45% by weight of rubber impact modifiers and F) from 0 to 40% by weight of additives or processing assistants.

The present invention furthermore relates to the use of these molding materials and to moldings, fibers or films comprising these molding materials.

Blends of the polyarylene sulfides and polyarylene ethers which are stable at high temperatures are known per se and have, for example, improved mechanical properties and higher resistance to chemicals compared with the individual components.

Blends which, in addition to polyarylene sulfides, contain polyarylene ethers carrying hydroxyl groups are also known. For example, GB-A-2 113 235 mentions materials for coatings comprising polyarylene sulfides and hydroxyl-containing polysulfones, the hydroxyl groups serving for crosslinking the coating. Japanese Preliminary Application JP-A 299 872/89 states that blends of polyarylene sulfones having terminal hydroxyl groups and polyarylene sulfides have improved mechanical properties when the sodium ion content of the polyarylene sulfide component is low. The purification of the polyarylene sulfides is expensive.

It is an object of the present invention to provide blends based on polyarylene ethers and polyarylene sulfides which, when commercially available polyarylene sulfides which have not been purified beforehand are used, have improved thermoplastic processing behavior in addition to improved mechanical properties and resistance to chemicals.

We have found that this object is achieved by the novel molding materials defined at the outset.

Component A

The novel molding materials contain, as component A, from 1 to 20, preferably from 2 to 15, % by weight of polyarylene ethers in which at least 0.03% by weight, based on the number average molecular weight $M_n$ of the polyarylene ethers, comprises terminal hydroxyl groups. In particular, the polyarylene ethers A are present in the novel molding materials in amounts of from 3 to 14% by weight.

Polyarylene ethers having repeating structural elements

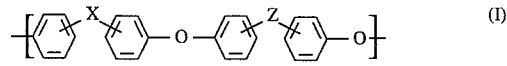
(I)

are used as component A. The derivatives thereof which are substituted in the nucleus may also be used. Preferred substituents are $C_1$–$C_6$-alkyl, such as methyl, ethyl, n-propyl, isopropyl, n-butyl, isobutyl or tert-butyl, $C_1$–$C_6$-alkoxy, such as methoxy or ethoxy, aryl, in particular phenyl, chlorine or fluorine. X may be —$SO_2$—, —SO—, —O—, —CO—, —N=N—, —RC=$CR^a$—, —$CR^bR^c$— or a chemical bond. Z may be —$SO_2$—, —SO—, —N=N— or —RC=$CR^a$. Here R and $R^a$ are each hydrogen, $C_1$–$C_6$-alkyl, e.g. methyl, ethyl, n-propyl, isopropyl or n-hexyl, $C_1$–$C_6$-alkoxy, including methoxy, ethoxy, n-propoxy, i-propoxy or n-butoxy, or aryl, in particular phenyl. $R^b$ and $R^c$ may each be hydrogen or $C_1$–$C_6$-alkyl, in particular methyl. However, they may also be bonded to one another to form a $C_4$–$C_{10}$-cycloalkyl ring, such as cyclopentyl or cyclohexyl, which in turn may be substituted by one or more alkyl groups, preferably methyl. Furthermore, $R^b$ and $R^c$ may also be $C_1$–$C_6$-alkoxy, e.g. methoxy or ethoxy or aryl, in particular phenyl. The abovementioned groups may in turn each be substituted by chlorine or fluorine.

The number average molecular weights ($\overline{M}_n$) of suitable polyarylene ethers A are in general from 1500 to 60,000 g/mol.

Suitable polyarylene ethers A include copolymers composed of polyarylene ether segments and structural units selected from the group consisting of the polyesters, aromatic polycarbonates, polyestercarbonates, polysiloxanes, polyimides, polyamidoimides and polyether imides. The molecular weights $\overline{M}_w$ of the polyarylene ether blocks or of the polyarylene ether grafts in such copolymers are in general 1000–30,000 g/mol. The blocks having different structures may be arranged alternately or randomly in the copolymers. The amount by weight of the polyarylene ethers in the copolymers is in general from 3 to 97, preferably 10 to 90, in particular from 20 to 80, % by weight.

Mixtures of different polyarylene ethers A may also be used.

Some suitable repeating units are shown below:

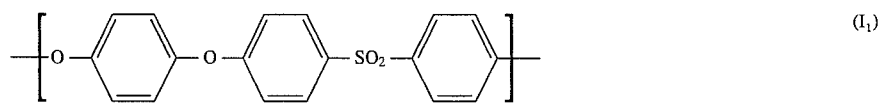
($I_1$)

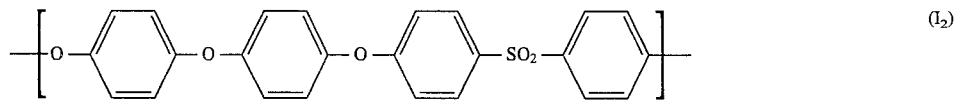
($I_2$)

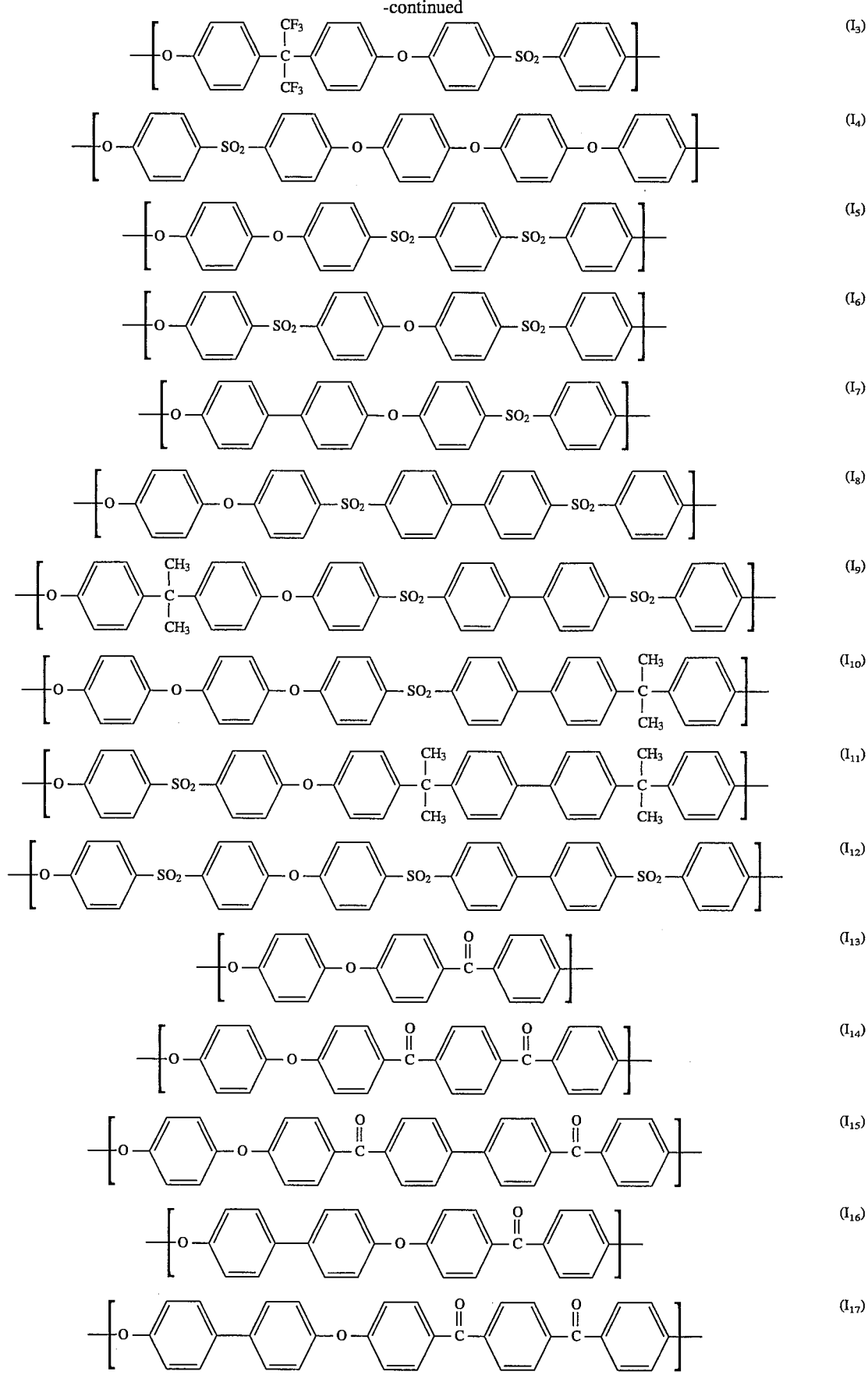

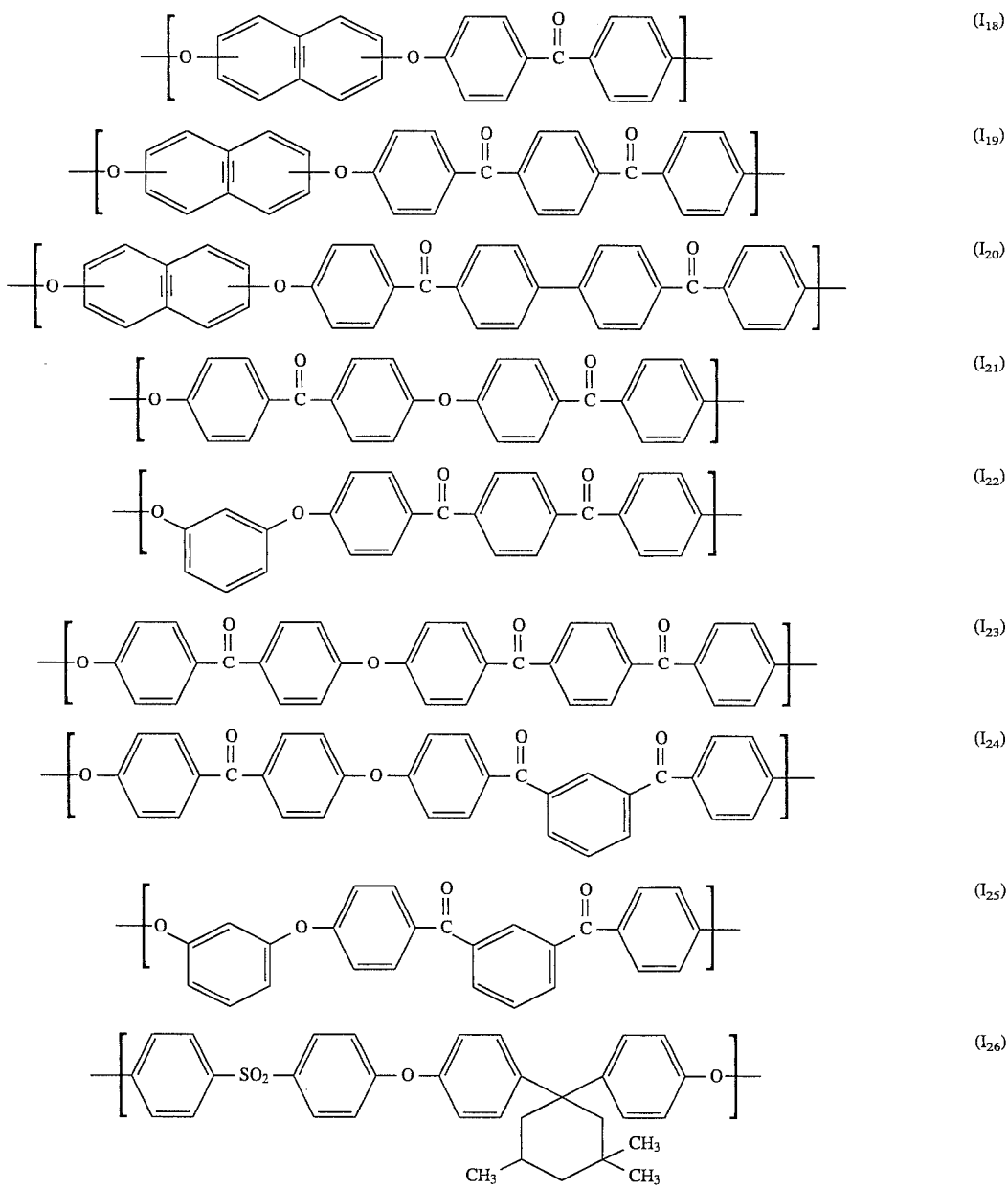

The particularly preferred polyarylene ethers A include those having a$_1$) from 0 to 100 mol % of repeating units

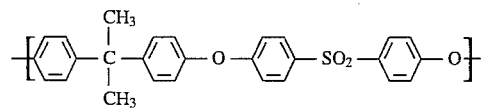 (II)

and a$_2$) from 0 to 100 mol % of repeating units

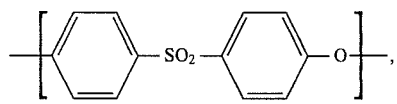 (III)

the molar percentages being based on the content of SO$_2$ groups. Polyarylene ethers A having from 3 to 97 mol % of repeating units (II) and from 3 to 97 mol % of repeating units (III) are particularly preferred.

The preparation of polyarylene ethers is generally known (cf. for example GB 1 152 035; U.S. Pat. No. 4,870,153; WO 84 03891), as is the preparation of polyarylene ethers having a block structure (DE 37 42 264). Methods for the synthesis of copolymers are described, for example, by A. Noshay et al., *Block Copolymers,* Academic Press, 1977.

The reaction of monomeric dihydroxy compounds with dihalogen compounds in aprotic polar solvents in the presence of an anhydrous alkali metal carbonate is particularly suitable. The combination of N-methylpyrrolidone as the solvent and potassium carbonate as the base, or the reaction in the melt, is particularly preferred. The reaction of acyl chlorides with aromatic compounds having abstractable hydrogen atoms in the presence of Lewis acids, such as aluminum trichloride, is also useful.

Polyarylene ethers A having terminal hydroxyl groups can be prepared, for example, by a suitable choice of the molar ratio of dihydroxymonomers to dichloromonomers (cf. for example McGrath et al. *Polym. Eng. Sci.* 17 (1977), 647;

Elias "Makromoleküle" 4th Edition (1981), pages 490 to 493, Hütig & Wepf-Verlag, Basle).

Preferably used polyarylene ethers A are those which contain from 0.03 to 2% by weight, based on the number average molecular weight $M_n$ of the polyarylene ethers, of terminal hydroxyl groups. Polyarylene ethers A having from 0.05 to 2, in particular from 0.1 to 1.5, % by weight of terminal hydroxyl groups are particularly preferred.

Component B

In addition to the polyarylene ethers A, the novel molding materials may contain from 5 to 95% by weight of polyarylene ethers B in which less than 0.03, preferably 0.025, % by weight, based on the number average molecular weight $M_n$ of the polyarylene ethers, comprises hydroxyl groups. The novel molding materials preferably contain from 8 to 93, in particular from 10 to 91, % by weight of the polyarylene ethers B.

The preferred polyarylene ethers B include those having repeating units of the formula III

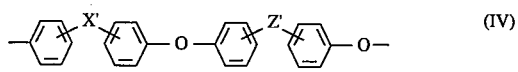  (IV)

where X' and Z' have the same meanings as X and Z. As in the case of the polyarylene ethers A, the polyarylene ethers B, too, may be copolymers or block copolymers, the structural units being selected from the group stated under A.

Polyarylene ethers B whose chain structure differs from that of the polyarylene ethers A may be used in the novel molding materials. It is also possible to use mixtures of different polyarylene ethers B. Polyarylene ethers B which are composed of the same repeating units as the polyarylene ethers A are preferably used. Polyarylene ethers B which contain from 0 to 100 mol % of repeating units II and from 0 to 100 mol % of repeating units III are very particularly preferred.

In general, the polyarylene ethers B have average molecular weights and relative viscosities in the range stated under A.

The polyarylene ethers B may contain, for example, halogen, methoxy, phenoxy, benzyloxy or amino groups as terminal groups.

Component C

A further essential component of the novel molding materials comprises polyarylene sulfides. The amount thereof is from 4 to 94% by weight. The novel molding materials preferably contain from 5 to 90, in particular from 6 to 87, % by weight of polyarylene sulfides.

All polyarylene sulfides can in principle be used as component C. However, polyarylene sulfides which contain more than 30, in particular more than 70, mol % of repeating units

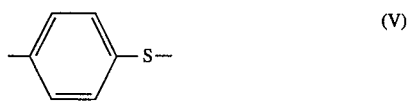  (V)

are preferred. Examples of further repeating units are

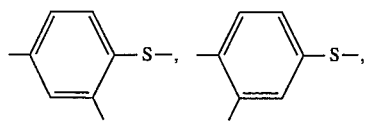

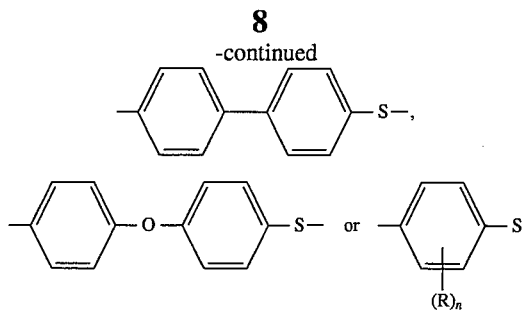

where R is $C_1$–$C_{10}$-alkyl, preferably methyl, and n is either 1 or 2. The polyarylene ether sulfides may be both random copolymers and block copolymers. Very particularly preferred polyphenylene sulfides contain 100 mol % of units V.

Examples of suitable terminal groups are halogen, thiol and hydroxyl, preferably halogen.

The preferred polyarylene sulfides have molecular weights of from 1000 to 100,000 g/mol.

Polyarylene sulfides are known per se or obtainable by known methods. For example, they can be prepared as described in U.S. Pat. No. 2,513,188, by reacting haloaromatics with sulfur or metal sulfides. It is also possible to heat metal salts of halogen-substituted thiophenols (cf. GB-B 962 941). The preferred syntheses of polyarylene sulfides include the reaction of alkali metal sulfides with haloaromatics in solution, as described in, for example, U.S. Pat. No. 3,354,129.

Component D

In addition to the components A to C, the novel molding materials may also contain reinforcing agents or fillers. The novel molding materials may contain, as component C, for example up to 60, preferably up to 45, preferably from 10 to 35, % by weight of fibrous or particulate fillers or reinforcing agents or mixtures thereof.

Preferred fibrous fillers or reinforcing agents are carbon fibers, potassium titanate whiskers, aramid fibers and particularly preferably glass fibers. When glass fibers are used, they may be treated with a size and an adhesion promoter to improve the compatibility with the matrix material. In general, the carbon and glass fibers used have a diameter of from 6 to 20 μm.

The glass fibers may be incorporated both in the form of short glass fibers and in the form of rovings. In the finished injection molded part, the average length of the glass fibers is preferably from 0.08 to 0.5 mm.

Carbon fibers or glass fibers may also be used in the form of woven fabrics, mats or glass rovings.

Particularly suitable particulate fillers are amorphous silica, magnesium carbonate (chalk), powdered quartz, mica, talc, feldspar, glass beads and in particular calcium silicates, such as wollastonite and kaolin (in particular calcined kaolin).

Preferred combinations of fillers are, for example, 20% by weight of glass fibers with 15% by weight of wollastonite and 15% by weight of glass fibers with 15% by weight of wollastonite.

Component E

The novel molding materials may furthermore contain from 0 to 45, preferably from 0 to 30, % by weight of rubber impact modifiers. Those which are capable of toughening the polyarylene ethers and/or polyarylene sulfides are particularly suitable.

Examples of rubbers which increase the toughness of the blends are:

EP and EPDM rubbers which have been grafted with functional groups. Suitable grafting reagents are, for example, maleic anhydride, itaconic acid, acrylic acid, glycidyl acrylate and glycidyl methacrylate.

These monomers can be grafted onto the polymer in the melt or in solution, in the presence or absence of a free radical initiator, such as cumyl hydroperoxide.

Copolymers of $\alpha$-olefins may also be mentioned. The $\alpha$-olefins are usually monomers of 2 to 8 carbon atoms, preferably ethylene and propylene. Comonomers which have proven suitable are alkyl acrylates or alkyl methacrylates which are derived from alcohols of 1 to 8 carbon atoms, preferably from ethanol, butanol or ethyl hexanol, and reactive comonomers such as acrylic acid, methacrylic acid, maleic acid, maleic anhydride or glycidyl (meth)acrylate, and also vinyl esters, in particular vinyl acetate. Mixtures of different comonomers may also be used. Copolymers of ethylene with ethyl or butyl acrylate and acrylic acid and/or maleic anhydride have proven particularly suitable.

The copolymers can be prepared by a high pressure process at from 400 to 4500 bar or by grafting the comonomers onto the poly-$\alpha$-olefin. The $\alpha$-olefin content of the copolymer is in general from 99.95 to 55% by weight.

A further group of suitable elastomers comprises core/shell graft rubbers. These are graft rubbers which have been prepared in emulsion and consist of at least one hard and one soft component. A hard component is usually understood as meaning a polymer having a glass transition temperature of at least 25° C., and a soft component as meaning a polymer having a glass transition temperature of not more than 0° C. These products have a structure comprising a core and at least one shell, the structure being determined by the order of addition of the monomers. The soft components are derived in general from butadiene, isoprene, alkyl acrylates, alkyl methacrylates or siloxanes and, if required, further comonomers. Suitable siloxane cores can be prepared, for example, starting from cyclic oligomeric octamethyltetrasiloxane or tetravinyltetramethyltetrasiloxane. These can be reacted, for example, with $\gamma$-mercaptopropylmethyldimethoxysilane in a ring-opening cationic polymerization, preferably in the presence of sulfonic acids, to give the soft siloxane cores. The siloxanes may also be crosslinked by, for example, carrying out the polymerization reaction in the presence of silanes having hydrolyzable groups, such as halogen or alkoxy groups, for example tetraethoxysilane, methyltrimethoxysilane or phenyltrimethoxysilane. Examples of suitable comonomers here are styrene, acrylonitrile and crosslinking or graft-linking monomers having more than one polymerizable double bond, such as diallyl phthalate, divinylbenzene, butanediol diacrylate or triallyl (iso)cyanurate. The hard components are derived in general from styrene, $\alpha$-methylstyrene and copolymers thereof, preferred comonomers here being acrylonitrile, methacrylonitrile and methyl methacrylate.

Preferred core/shell graft rubbers contain a soft core and a hard shell or a hard core, a first soft shell and at least one further hard shell. The incorporation of functional groups, such as carbonyl, carboxyl, anhydride, amido, imido, carboxylic ester, amino, hydroxyl, epoxy, oxazoline, urethane, urea, lactam or halobenzyl, is effected here, preferably by adding suitable functionalized monomers during the polymerization of the final shell. Suitable functionalized monomers are, for example, maleic acid, maleic anhydride, mono- or diesters of maleic acid, tert-butyl (meth)acrylate, acrylic acid, glycidyl (meth)acrylate and vinyloxazoline. The content of monomers having functional groups is in general from 0.1 to 25, preferably from 0.25 to 15, % by weight, based on the total weight of the core/shell graft rubber. The weight ratio of soft to hard components is in general from 1:9 to 9:1, preferably from 3:7 to 8:2.

Such rubbers are known per se and are described, for example, in EP-A 208 187.

A further group of suitable impact modifiers comprises thermoplastic polyester elastomers. Polyester elastomers are understood as being segmented copolyether esters which contain long-chain segments which are derived as a rule from poly(alkylene) ether glycols and short-chain segments which are derived from low molecular weight diols and dicarboxylic acids. Such products are known per se and are described in the literature, for example in U.S. Pat. No. 3,651,014. Appropriate products are also commercially available under the names Hytrel® (Du Pont), Arnitel® (Akzo) and Pelprene® (Toyobo Co. Ltd.).

Mixtures of different rubbers can of course also be used.

Component F

In addition to the components A to D described, the novel molding materials may also contain from 0 to 40% by weight of flame proofing agents, pigments and stabilizers.

The novel molding materials can also be prepared by methods known per se, for example extrusion.

The novel molding materials can be prepared, for example, by mixing the starting components in a conventional mixing apparatus, such as a screw extruder, preferably a twin-screw extruder, a Brabender mill or a Banburry mill, or a kneader, and then extruding the mixture. After extrusion, the extrudate is cooled and comminuted.

The order in which the components are mixed may be varied; for example, two or, if required, three components may be premixed or all components may be mixed together.

Thorough mixing is advantageous for obtaining a very homogeneous molding material. For this purpose, in general average mixing times of from 0.2 to 30 minutes at from 250°–400° C., preferably from 280°–380° C., are required. After extrusion, the extrudate is as a rule cooled and comminuted.

The novel molding materials can be processed by a thermoplastic method. They have good rigidity in combination with good flows and processing stabilities. The novel molding materials are particularly suitable for the production of household appliances or apparatuses for the medical sector. However, they can also be used in the electrical or electronics sector. In addition to moldings, films or fibers can also be produced from the novel molding materials.

EXAMPLES

Testing of performance characteristics

The viscosity number (VN) was determined in each case in 1% strength by weight solution in a 1:1 mixture of phenol and 1,2-dichlorobenzene at 25° C.

The terminal hydroxyl group contents were determined by potentiometric titration. The percentages by weight of the terminal hydroxyl groups were calculated by dividing the weight of the hydroxyl groups (in grams) determined by the titration by in each case the weight of the polyarylene ether sulfones (in grams) and multiplying the result by 100.

The heat distortion resistance of the samples was determined by means of the Vicar softening temperature. The latter was determined according to DIN 53 460 using standard small bars, with a force of 49.05N and a temperature increase of 50K per hour.

The modulus of elasticity was determined in the tensile test according to DIN 53 455 using dumbbells. The flow (MVI) was determined according to DIN 53 735 at 320° C. and under a load of 21.6 kg.

The damaging energy Ws was determined in the case of unreinforced samples using circular discs, according to DIN 53 443. The impact strength of reinforced samples was determined according to DIN 53 453 using standard small bars.

The processing stability of the samples was evaluated on the basis of the change in the flow of the melts after the latter had been standing for 5 minutes and 25 minutes ($\Delta MVI = [MVI_5 - MVI_{25'}]/MVI_{5',.100}\%$) at 380° C. and under a load of 5 kg.

The water absorption of the samples was determined using dumbbells which had been stored in boiling water for 14 days (weight increase in %).

BLEND COMPONENTS

Component $A_1$

Polyarylene ether obtained from 4,4'-dihydroxydiphenyl sulfone and 4,4'-dichlorodiphenyl sulfone, having a VN of 57 ml/g and 0.12% by weight of terminal OH groups.

Component $B_1$

Polyarylene ether obtained from 4,4'-dihydroxydiphenyl sulfone and 4,4'-dichlorodiphenyl sulfone, characterized by a VN of 59 ml/g (e.g. commercial product Ultrason E from BASF).

Component $C_1$

Polyphenylene sulfide, characterized by a modulus of elasticity of 3200 N/mm² (e.g. commercial product Fortron 0214 from Hoechst).

Component $D_1$

Glass rovings which have a thickness of 10 μm, consist of E glass and had been treated with a polyurethane size. After incorporation, the average lengths of the glass fibers were from about 0.1 to 0.5 mm.

The components were mixed in a twin-screw extruder at a melt temperature of from 300° to 350° C. The melt was passed through a waterbath and granulated.

The dry granules were processed at from 310° to 340° C. to give standard small bars, dumbbells and circular disks.

The composition of the molding materials and the results of the testing of the performance characteristics are shown in Tables 1 and 2.

TABLE 2

| | Reinforced molding materials | | | | | |
|---|---|---|---|---|---|---|
| | Example No. | | | | | |
| | $V_6$ | $V_7$ | $V_8$ | 3 | 4 | $V_9$ |
| Components | | | | | | |
| $A_1$ | — | — | — | 5 | 14 | 25 |
| $B_1$ | — | 70 | 49 | 44 | 35 | 24 |
| $C_1$ | 70 | — | 21 | 21 | 21 | 21 |
| $D_1$ | 30 | 30 | 30 | 30 | 30 | 30 |
| Properties | | | | | | |
| Vicat B [°C.] | >250 | 222 | 221 | 222 | 221 | 222 |
| Modulus of elasticity [N/mm²] | 12200 | 8850 | 10300 | 10250 | 10300 | 10300 |
| $a_n$ [kJ/m²] | 26.0 | 22.5 | 22.1 | 25.4 | 29.4 | 31.0 |
| MVI [ml/10'] | 190 | 20 | 63 | 64 | 63 | 65 |
| ΔMVI [%] | 120 | 16 | 35 | 21 | 22 | 72 |
| Water absorption [%] | 0.1 | 1.3 | 0.8 | 0.8 | 0.8 | 0.8 |

$V_6$ to $V_9$: Comparative experiments

The novel molding materials have improved flow, increased rigidity and improved toughness. In addition, the processing stability is substantially improved.

We claim:

1. A molding material comprising

A) from 1 to 20% by weight of polyarylene ethers in which at least 0.03% by weight, based on the number average molecular weight $M_n$ of the polyarylene ethers, comprises terminal hydroxyl groups and which contain repeating units of the formula I

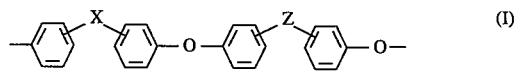

or corresponding units substituted in the nucleus by $C_1$–$C_6$-alkyl, $C_1$–$C_6$-alkoxy, aryl, chlorine or fluorine, where

TABLE 1

| | Unreinforced molding materials | | | | | | |
|---|---|---|---|---|---|---|---|
| | Example No. | | | | | | |
| | $V_1$ | $V_2$ | $V_3$ | $V_4$ | 1 | 2 | $V_5$ |
| Components | | | | | | | |
| $A_1$ | — | — | — | 0.5 | 5 | 14 | 25 |
| $B_1$ | 100 | — | 80 | 79.5 | 75 | 66 | 55 |
| $C_1$ | — | 100 | 20 | 20 | 20 | 20 | 20 |
| Properties | | | | | | | |
| Vicat B [°C.] | 216 | >250 | 215 | 215 | 215 | 215 | 215 |
| Modulus of elasticity [N/mm²] | 2700 | 3200 | 2900 | 2900 | 2880 | 2800 | 2750 |
| $W_s$ [Nm] | 70 | 0.5 | 23 | 22 | 68 | 65 | 70 |
| MVI [ml/10'] | 54 | <250 | 108 | 110 | 111 | 113 | 114 |
| ΔMVI | 2 | 70 | 22 | 10 | 14 | 14 | 37 |
| Water absorption [%] | 1.9 | 0.1 | 1.4 | 1.4 | 1.4 | 1.4 | 1.4 |

$V_1$ to $V_5$: Comparative experiments

Experiments 1 and 2 show that molding materials which do not contain the component A have poor values for the damaging energy; if the amount of component A is too large, the result is a deterioration in the processing stability. Only the novel compositions have a balanced property profile.

X may be —SO$_2$—, —SO—, —O—, CO, —N=N—, —RC=CR$^a$—, —CR$^b$R$^c$— or a chemical bond and Z is selected from the group consisting of —SO$_2$—, —SO—, CO, —N=N— and —RC=CR$^a$—, R and R$^a$ are each hydrogen or C$_1$–C$_6$-alkyl and R$^b$ and R$^c$ may each be hydrogen or C$_1$–C$_6$-alkyl, C$_4$–C$_{10}$-cycloalkyl, C$_1$–C$_6$-alkoxy, C$_4$–C$_{10}$-cycloalkyl, C$_1$–C$_6$-alkoxy or aryl or a fluorine or chlorine derivate of each of these, B) from 5 to 95% by weight of polyarylene ethers in which less than 0.03% by weight, based on the number average molecular weight M$_n$ of the polyarylene ethers, comprises hydroxyl groups, whereby the average molecular weights and relative viscosities of the polyarylene ethers B are in the same range as those of the polyarylene ethers A, C) from 4 to 94% by weight of polyarylene sulfides, D) from 0 to 60% by weight of fibrous or particulate fillers, E) from 0 to 45% by weight of rubber impact modifiers, and F) from 0 to 40% by weight of additives or processing assistants.

2. A molding material as defined in claim 1, in which the polyarylene ethers A contain a$_1$) from 3 to 97 mol % of repeating units

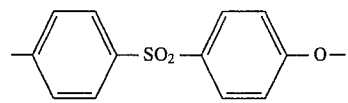

and a$_2$) from 3 to 97 mol % of repeating units

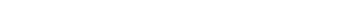

3. A molding material as defined in claim 1, in which the polyarylene ethers A contain from 0.05 to 2% by weight, based on the number average molecular weight (M$_n$), of terminal hydroxyl groups.

4. A molding material as defined in claim 1, in which the polyarylene ethers B contain b$_1$) repeating units II and b$_2$) repeating units III.

5. A molding material as defined in claim 1, in which the polyarylene sulfides contain repeating units

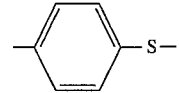

6. A molding, fiber or film containing a molding material as defined in claim 1.

* * * * *